O. H. BUCKLEY.
Tea and Coffee Strainers.
No. 217,055. Patented July 1, 1879.
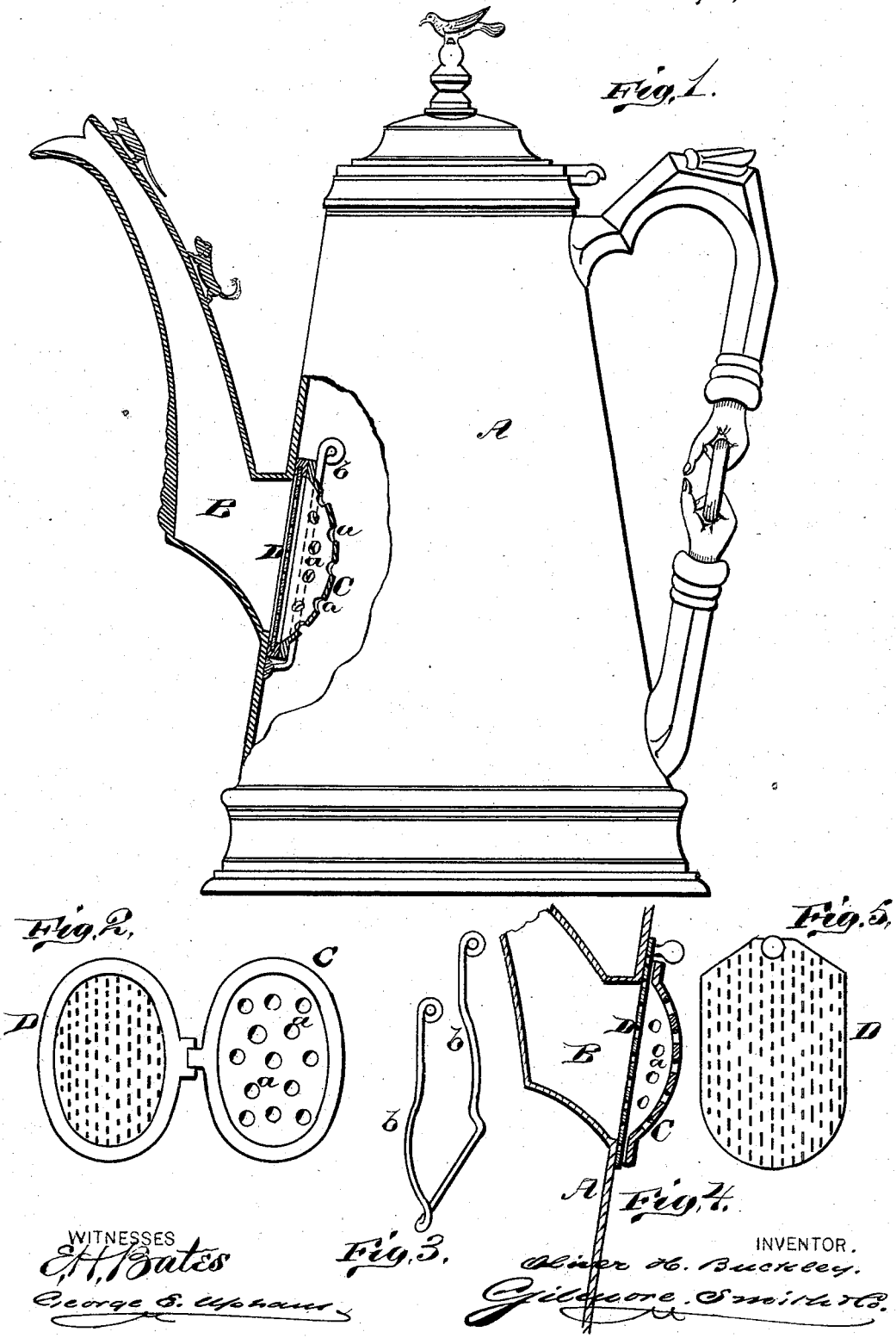

UNITED STATES PATENT OFFICE.

OLIVER H. BUCKLEY, OF STEVENS' PLAINS, MAINE.

IMPROVEMENT IN TEA AND COFFEE STRAINERS.

Specification forming part of Letters Patent No. 217,055, dated July 1, 1879; application filed June 7, 1879.

*To all whom it may concern:*

Be it known that I, OLIVER H. BUCKLEY, of Stevens' Plains, in the county of Cumberland and State of Maine, have invented a new and valuable Improvement in Tea and Coffee Strainers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a part-sectional side view of my strainer as applied to tea or coffee pots, and Figs. 2, 3, 4, and 5 are details of the same.

My invention relates to strainers for tea and coffee; and it consists in a double strainer, one part having larger perforations than the other, and one or both removable from the inside of the tea or coffee pot; also, in the construction and combination of parts, as will be hereinafter more fully set forth.

The annexed drawings, to which reference is made, fully illustrate my invention.

A represents an ordinary tea or coffee pot with spout B.

The double strainer is composed of a bowl or cap shaped strainer, C, having numerous perforations $a$, as shown, and a strainer, D, of perforated sheet metal or fine wire-cloth, the perforations or meshes of this strainer being smaller than the perforations $a$ in the strainer C.

These two strainers are applied to the inside of the pot A, immediately at the bottom or inner end of the spout B, the strainer D being next to the entrance of the spout, and the larger strainer, C, covering the same on the inside of the pot.

The small strainer, D, prevents fine grounds, &c., from passing out with the fluid, while the large strainer prevents the heavy grounds, tea-leaves, &c., from clogging up the smaller strainer, thus insuring at all times a full and even flow of the fluid through the spout.

The two strainers may be hinged together, as shown in Fig. 2, and both held on the inside of the pot in proper place by means of spring hooks or catches $b\ b$, permanently attached to the inner side of the pot; or the large strainer, C, may be permanently fastened to the inside of the pot at its sides in such a manner that the small strainer, D, can slide in between it and the side of the pot.

In the former case both strainers are removable, while in the latter case only the small strainer is removable; but in either case the strainers can be easily cleaned when desired.

The entire strainer will be made of such metal that will not rust or corrode.

What I claim as new, and desire to secure by Letters Patent, is—

1. The combination, with the discharge-spout of a tea or coffee pot, of a strainer, D, arranged over the inner end of the spout, and a strainer, C, covering the same, the perforations in the latter being larger than those in the former, substantially as and for the purpose set forth.

2. The removable double strainer C D, hinged together, the strainer C being provided with larger perforations than those in the strainer D, and arranged over the inner end of the discharge-spout B, in combination with the pot A, having the spring-hooks $b$, substantially as described, and for the purpose set forth.

In testimony that I claim the above I have hereunto subscribed my name in the presence of two witnesses.

OLIVER H. BUCKLEY.

Witnesses:
DAVID TORREY,
EDWARD C. STEVENS.